July 5, 1955 A. BAUER 2,712,216
FLUIDTIGHT CASE FOR WATCHES
Filed Sept. 3, 1954 2 Sheets-Sheet 1
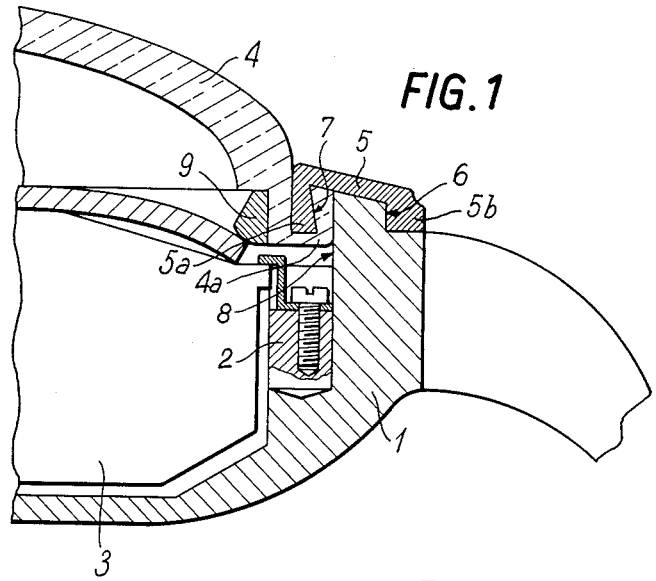
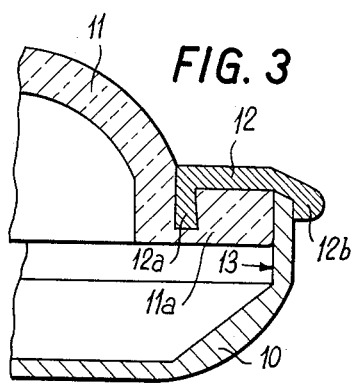
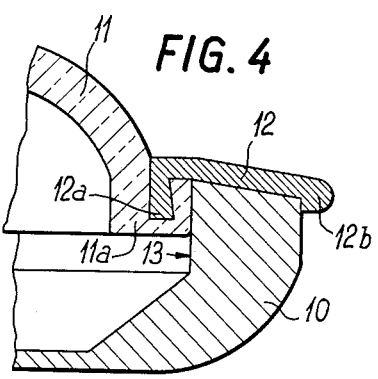
Inventor:
Alfred Bauer
by J. Delattre-Seguy
Attorney

# United States Patent Office 2,712,216
Patented July 5, 1955

2,712,216

FLUIDTIGHT CASE FOR WATCHES

Alfred Bauer, Le Locle, Switzerland

Application September 3, 1954, Serial No. 454,091

Claims priority, application Switzerland March 12, 1954

9 Claims. (Cl. 58—90)

My invention has for its object a fluidtight case for watches, wherein the peripheral flange of the glass engages with friction the body of the case, fluidtightness being provided by a rim covering the edge of said case body and including an annular depending flange embedded inside the peripheral flange of the glass.

I have illustrated by way of example in accompanying drawings three preferred embodiments of my improved case. In said drawings:

Fig. 1 is a partial axial cross-section of a first embodiment.

Fig. 2 is a plan view of the second embodiment.

Figs. 3 and 4 are cross-sections on an enlarged scale, through lines III—III and IV—IV respectively, of Fig. 2.

Figure 5:
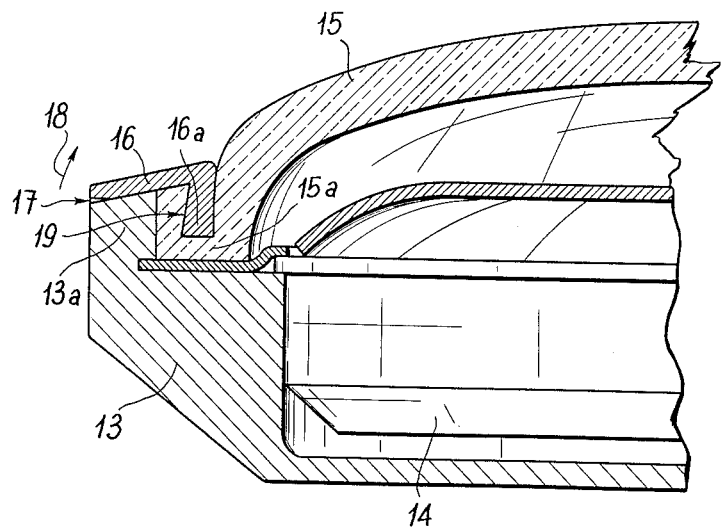
Fig. 5 is a partial axial cross-section of a third embodiment.

The watch case illustrated in Fig. 1 is a cylindrical case including a cylindrical part rigid with the bottom and inside which the clockwork 3 is secured by means of an annular fitting member 2. The glass 4 made of non-breakable material is fluidtightly assembled with the case body 1 through frictional engagement of its peripheral flange 4a inside the cylindrical part of said body. A rim 5 is provided with two coaxial annular depending flanges 5a and 5b, of which the inner flange 5a engages and is embedded in the flange 4a of the glass while the outer flange 5b is frictionally mounted over a cylindrical bearing section 6 projecting upwardly above the case body 1. Said rim 5 is thus assembled with the glass in a permanent manner, without any possibility of disconnection between said parts, the outer peripheral lateral surface 7 of the inner flange 5a of the rim flaring downwardly and outwardly.

The rim 5 exerts an outwardly radial pressure which urges the flange 4a of the glass against the inner surface 8 of the case body so as to ensure fluidtightness for the assembled case.

A ring 9 fitted inside the flange 4a of the glass forms a glass-bearing or wedging member.

In the embodiment illustrated in Figs. 2 to 4, the case assumes a square shape and includes as precedingly a body 10 rigid with a bottom, a glass 1 of non-breakable material, the peripheral flange 11a of which is frictionally engaged inside said body, and a rim 12 the inner flange 12a of which is embedded inside said flange 11a of the glass while its outer flange 12b is frictionally fitted over the body of the case.

The central opening of the rim 12 is square and its shape corresponds to the outer shape of the case body 10 while the outer periphery of the flange 11a of the glass and also the inner surface 13 of the housing defined by the case body and engaged by said flange are circular. Said arrangement improves the fluidtightness which is always difficult to obtain in the case of shaped members and it allows resorting to a cylindrical clockwork the size of which is larger than that of the opening in the rim.

The case illustrated in Fig. 5 includes a body 13 in one with the bottom and inside which is fitted a clockwork 14. The glass 15 is provided with an annular flange 15a frictionally engaging the inner surface of the upper section 13a of the body 13. The assembly of the glass with the body of the case is fluidtight, the flange 15a of the glass exerting a radial pressure on the wall of the section 13a. This pressure is increased by the presence of the annular flange 16a formed on the rim 16 and embedded within the thickness of the flange 15a of the glass. Said flange 16a extends coaxially with the rim towards the bottom of the body of the case. Its outer surface flares outwardly and downwardly, whereby the assembly of the case with the rim is obtained in a permanent non-releasable manner. The rim covers thus both the upper section of the case body on which it rests freely and the flange 15a of the glass.

The fact that the flange 16a is in one with the rim 16 bestows the desired rigidity to the system and increases the reinforcing action provided by the flange 16a. When it is desired to remove the glass, it is sufficient to introduce a tool underneath a nail-hole 17 provided in the outer part of the rim 16 between the latter and the case body so as to raise the glass together with the rim without any risk of damage to said glass. Furthermore, the rim forms a lever arm the part played by which consists in exerting a bending torque on the edge of the glass in the direction of the arrow 18, which furthers the removal of the glass.

What I claim is:

1. A fluidtight watch case comprising an annular case body, a rim fitted over the upper edge of the body and projecting inwardly thereof and including along its inner periphery a depending flange and a glass extending over the case and including an outer peripheral flange fitted frictionally inside the upper end of the inner surface of the body underneath said inner peripheral flange of the rim and inside which said inner peripheral flange of the rim is embedded.

2. A fluidtight watch case comprising an annular case body including an upper annular upstanding projection, a rim fitted over the upper edge of the projection, projecting inwardly thereof and including an inner and an outer peripheral depending flange, said outer flange engaging the outer surface of the upper projection of the body, and a glass extending over the case and including an outer peripheral flange fitted frictionally inside the upper end of the inner surface of the body and inside which the inner peripheral flange of the rim is embedded, the two flanges of the rim urging into contacting relationship the outer portion of the glass flange and the upper projection on the body.

3. A fluidtight watch case comprising an annular case body including an upper annular upstanding projection, a rim fitted over the upper edge of the projection, projecting inwardly thereof and including an inner and an outer peripheral depending flange, said outer flange engaging the outer surface of the upper projection of the body and the outer peripheral surface of the inner flange having a downwardly and outwardly flaring shape, and a glass extending over the case and including an outer peripheral flange fitted frictionally inside the upper end of the inner surface of the body and inside which the inner peripheral flange of the rim is embedded, the two flanges of the rim urging into contacting relationship the outer portion of the glass flange and the upper projection on the body.

4. A fluidtight watch case comprising an annular case body including an upper annular upstanding projection, a rim fitted over the upper edge of the projection, projecting inwardly thereof and including an inner and an outer peripheral depending flange, said outer flange engaging frictionally the outer surface of the upper projection of the body and a glass extending over the case and including an outer peripheral flange fitted frictionally inside the upper end of the inner surface of the body and inside which the inner peripheral flange of the rim is embedded, the two flanges of the rim urging into contacting relationship the outer portion of the glass flange and the upper projection on the body.

5. A fluidtight watch case comprising an annular case body including a bottom rigid therewith and an upper annular upstanding projection, a rim fitted over the upper edge of the projection, projecting inwardly thereof and including an inner and an outer peripheral depending flange, said outer flange engaging the outer surface of the upper projection of the body and a glass extending over the case and including an outer peripheral flange fitted frictionally inside the upper end of the inner surface of the body and inside which the inner peripheral flange of the rim is embedded, the two flanges of the rim urging into contacting relationship the outer portion of the glass flange and the upper projection on the body.

6. A fluidtight watch case comprising an annular case body including an upper annular upstanding projection, a rim fitted over the upper edge of said projection, projecting inwardly thereof and including an inner and an outer peripheral depending flange, said outer flange engaging the outer surface of the upper projection of the body and a glass extending over the case and including an outer peripheral flange fitted frictionally inside the upper end of the inner surface of the body and inside which the inner peripheral flange of the rim is embedded, the inner outline of the rim having a shape different from circularity and the outer periphery of the glass flange and associated inner surface of the case engaging same being circular, the two flanges of the rim urging into contacting relationship the outer portion of the glass flange and the upper projection on the body.

7. A fluidtight watch case comprising an annular case body including an upper annular upstanding projection, a rim fitted over the upper edge of the projection extending inwardly thereof and including an inner and an outer peripheral depending flange, said outer flange engaging the outer surface of the upper projection of the body, and a glass extending over the case and including an outer peripheral flange fitted frictionally inside the upper end of the inner surface of the body and inside which the inner peripheral flange of the rim is embedded, the inner outline of the rim having a shape different from circularity, the outer periphery of the case assuming a shape matching that of the inner outline of the rim, the outer periphery of the glass flange and associated inner surface of the case engaging same being circular, the two flanges of the rim urging into contacting relationship the outer portion of the glass flange and the upper projection on the body.

8. A fluidtight watch case comprising an annular case body including a bottom rigid therewith, a rim fitted over the upper edge of the body and projecting inwardly thereof and including along its inner periphery a depending flange directed towards the bottom of the case body, a glass extending over the case and including an outer peripheral flange fitted frictionally inside the upper end of the inner surface of the body and inside which the inner peripheral flange of the rim is embedded, the rim resting both on the upper edge of the annular case body and on the outer section of the glass flange.

9. A fluidtight watch case comprising an annular case body, a rim fitted over the upper edge of the body and projecting inwardly thereof and including along its inner periphery a depending flange, the outer surface of said flange flaring outwardly and downwardly, a glass extending over the case and including an outer peripheral flange fitted frictionally inside the upper end of the inner surface of the body and inside which the inner peripheral flange of the rim is embedded, the rim resting both on the upper edge of the annular case body and on the outer section of the glass flange.

No references cited.